(12) United States Patent
Blanchard et al.

(10) Patent No.: US 10,393,900 B2
(45) Date of Patent: Aug. 27, 2019

(54) PROCESS FOR CHARACTERISING THE EVOLUTION OF AN OIL OR GAS RESERVOIR OVER TIME

(71) Applicant: Total S.A., Paris (FR)

(72) Inventors: Thomas David Blanchard, Aberdeen (GB); Pierre Daniel Thore, Aberdeen (GB); Christian Hubans, Pau (FR)

(73) Assignee: Total S.A., Courbevoie (FR)

( * ) Notice: Subject to any disclaimer, the term of this patent is extended or adjusted under 35 U.S.C. 154(b) by 35 days.

(21) Appl. No.: 15/117,370

(22) PCT Filed: Feb. 9, 2015

(86) PCT No.: PCT/EP2015/052648
§ 371 (c)(1),
(2) Date: Aug. 8, 2016

(87) PCT Pub. No.: WO2015/121200
PCT Pub. Date: Aug. 20, 2015

(65) Prior Publication Data
US 2016/0349391 A1    Dec. 1, 2016

(30) Foreign Application Priority Data
Feb. 12, 2014   (GB) .................................. 1402440.0

(51) Int. Cl.
*G01V 1/30* (2006.01)

(52) U.S. Cl.
CPC ...... *G01V 1/308* (2013.01); *G01V 2210/6122* (2013.01)

(58) Field of Classification Search
None
See application file for complete search history.

(56) References Cited

U.S. PATENT DOCUMENTS

| | | | |
|---|---|---|---|
| 8,868,391 B2 * | 10/2014 | Grandi | G01V 1/30 703/10 |
| 2008/0189043 A1 | 8/2008 | Anno et al. | |
| 2013/0176822 A1 | 7/2013 | Thore et al. | |
| 2016/0146959 A1 * | 5/2016 | Purves | G01V 1/302 702/16 |

FOREIGN PATENT DOCUMENTS

| | | |
|---|---|---|
| EP | 1865340 A1 | 12/2007 |
| WO | WO-2012010790 A2 | 1/2012 |
| WO | WO-2012038647 A1 | 3/2012 |

OTHER PUBLICATIONS

Fernandes, Paulo, "International Search Report," prepared for PCT/EP2015/052648, dated Sep. 28, 2015, four pages.

* cited by examiner

*Primary Examiner* — David M. Gray
*Assistant Examiner* — Geoffrey T Evans
(74) *Attorney, Agent, or Firm* — Winstead PC

(57) ABSTRACT

Disclosed is a method for characterizing the evolution of a reservoir by determining a seismic wavelet which links observed seismic data to a sequence of reflectivities. The method comprises obtaining seismic data (200) representing seismic changes which have occurred between a first time and a second time, said seismic data comprising a plurality of seismic traces; and performing an optimization operation simultaneously (230) on the seismic traces so as to optimize for said seismic wavelet. The optimization operation may be performed without using known reflectivity data as an input.

17 Claims, 3 Drawing Sheets

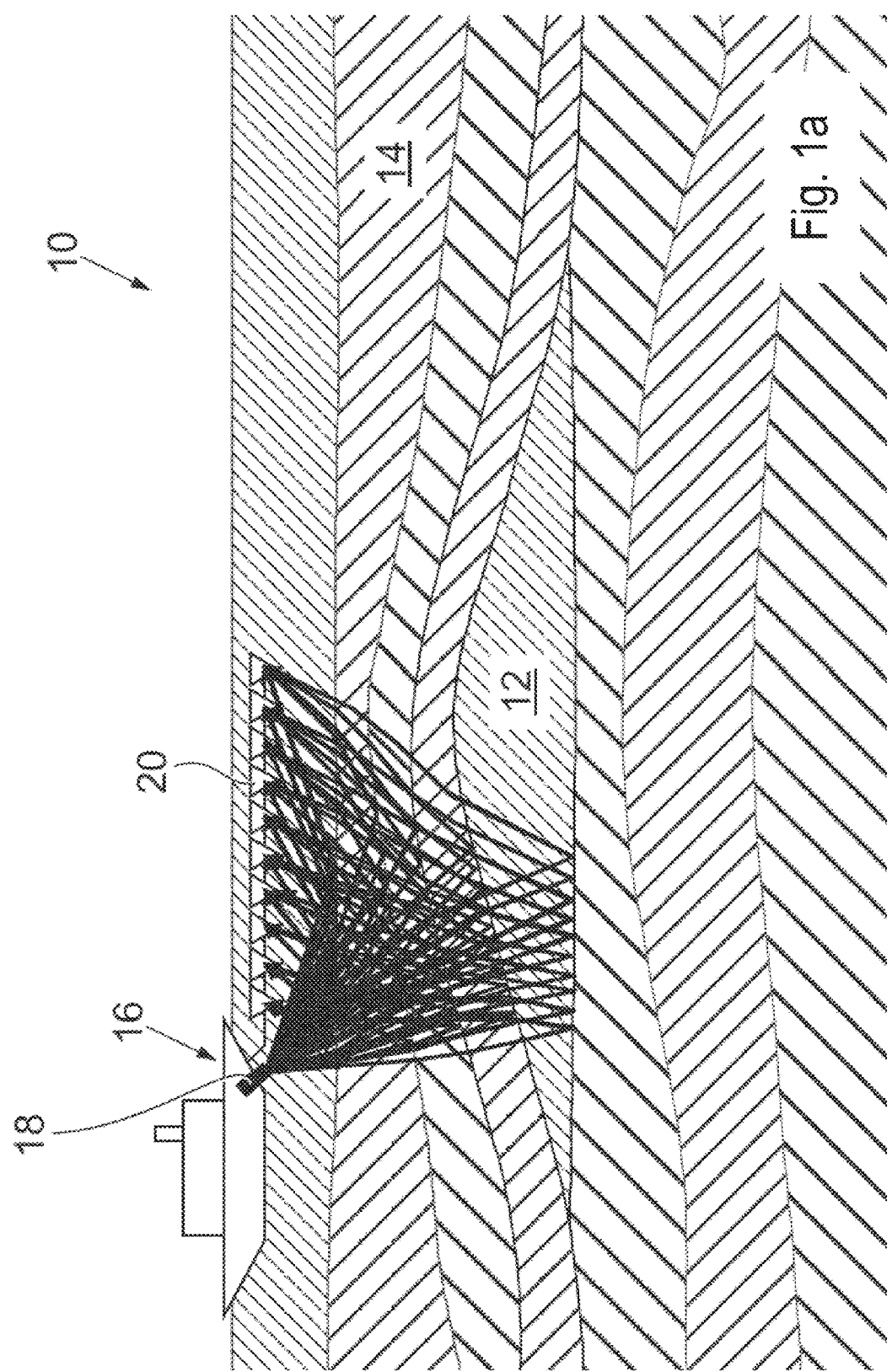

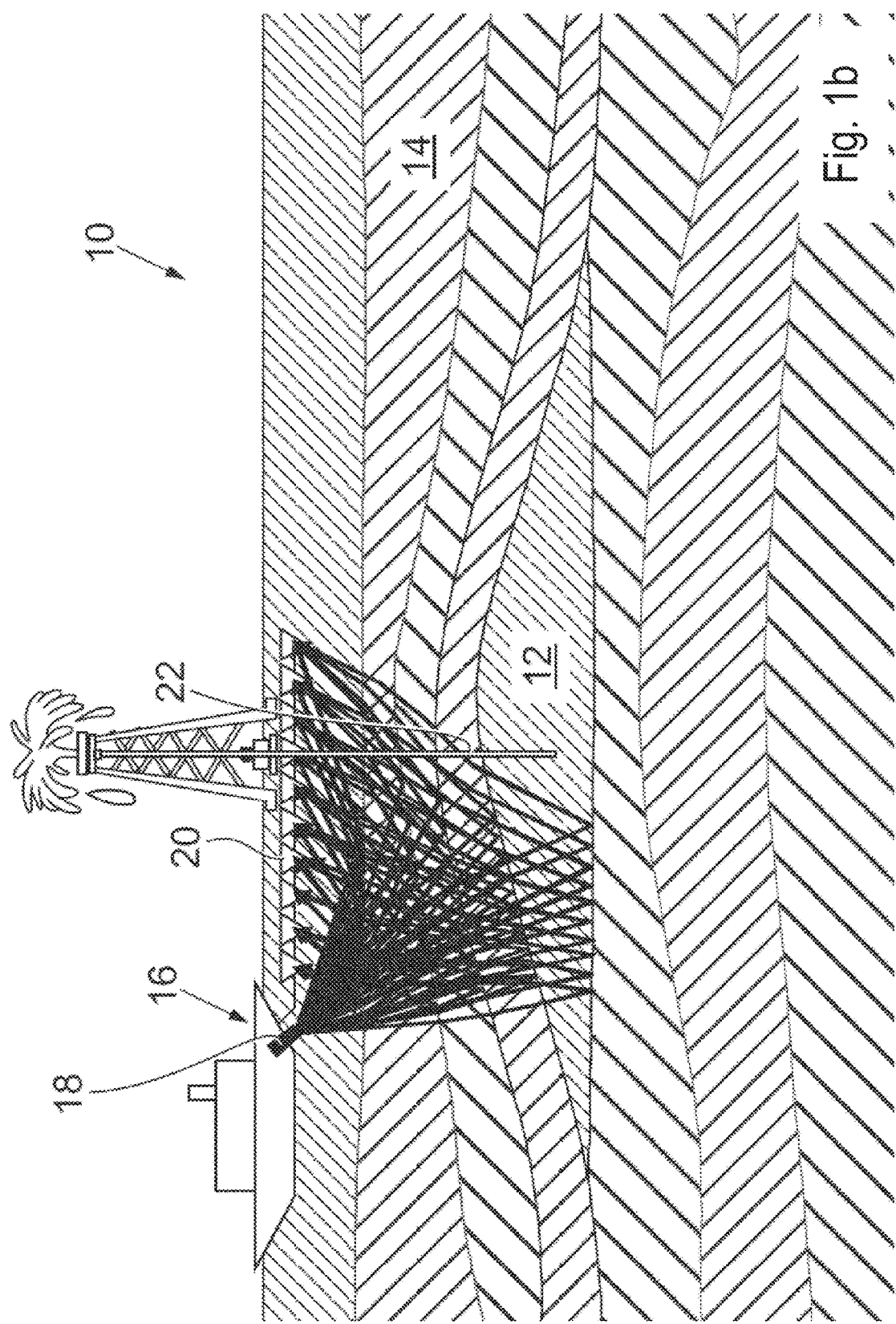

PROCESS FOR CHARACTERISING THE EVOLUTION OF AN OIL OR GAS RESERVOIR OVER TIME

The present invention relates generally to the field of geosciences and more particularly to seismic data processing. Specifically the invention relates to a method to extract the time-lapsed changes in 3D seismic data sets collected over a production period to integrate with production data and assist in understanding and managing the extraction of oil and gas from reservoirs or the injection of other fluids into the reservoirs.

In the oil and gas industry, seismic surveys are carried out in order to provide subsurface images so that accumulations of hydrocarbons or other fluids might be identified. In a seismic survey, one or several sources emit elastic waves in the form of pressure or ground motion modulation from specific locations (wavefield), at or below the land or sea surface or in a borehole. This wavefield propagates away from the source(s) through the subsurface. Along with this propagation, a fraction of the incident wavefield is reflected from the fraction of the global heterogeneities in the elastic material properties of the subsurface (such as acoustic impedance). This excitation by the incident wavefield generates a reflected wavefield from the heterogeneities, which manifests as pressure, particle motion or some derived quantities and can be detected and recorded at the surface or in a borehole at a number of receiver locations.

Processing of the measurements is undertaken so as to construct a 3D image of the sub-surface. Repeated surveys at selected time intervals (days, months, years) allow observation of the changes in, over or under a given reservoir across the time interval—e.g. before oil or gas production starts and after some period of production or injection—and to compare the results of measurements. This is called 4D seismic and involves comparing 3D seismic surveys carried out at different time instances. The aim is to observe changes in the state of the formations and fluids consequent upon production of hydrocarbons from or the injection of fluids into a reservoir. Proper detection of the changes and proper identification of the effects, factors and processes requires specialised acquisition techniques and data processing steps.

Changes in the reservoir over time, due to exploitation, will cause changes to the petrophysical properties of the rock and therefore to the seismic velocity field. For example, oil will be substituted by gas or water and/or the fluid pressure will change, causing changes in saturation, and pressure, and consequently changes in elastic properties. Changes within the reservoir may also change the stress and strain state of the surrounding rocks, further causing changes in their elastic properties. These changes to velocity will produce time shifts in the seismic expression of underlying reflectors and associated changes in reflectivity, causing a change in the local wavefield.

In order to model these changes in the reservoir, a number of known inversion techniques are used. These are performed on surveys separated by a time interval to obtain an estimate of the changes having occurred in that time interval. Firstly, the data within the seismic data sets are realigned or conditioned to compensate for variations in acquisition (or non-repeatability of seismic surveys) and changes in velocity in the sub-surface.

One well known technique is that known as impedance inversion, where changes in impedance of the sub-surface are inverted for. Another technique makes use of cross-correlation between different vintages in selected windows. This is done in order to achieve alignment in time of the base and monitor surveys. This time alignment is measured by cross-correlation and applied to the monitor survey, which is therefore aligned with the base. The window is a time interval representing a portion of a trace and is set across traces for correlation, and thus should contain all the 4D effects.

Also recently developed are inversion techniques made possible using the tools known as Cal4D and Propagation4D. Cal4D, described in patent application WO2012/010790, attempts to find step (layer) perturbations at the well position. Propagation4D, described in patent application WO2012/038647, propagates this information from the wells to the rest of a 3D cube. These documents are hereby incorporated by reference.

The parameters of which variations are estimated between base and monitor surveys may comprise the density $\rho$, the speed $V_p$ of propagation of the pressure waves (P waves) and the speed $V_S$ of propagation of the shear waves (S waves) in the media forming the various geological layers of the area explored. Reference is often made to the seismic impedances in each medium, $I_p = \rho * V_p$ and $I_S = \rho * V_S$, which govern the propagation of the P waves and S waves in the layers. Because of the changes linked to oil production, for example the replacement of oil with water or gas, the parameters $\rho$, Vp, VS are modified in certain layers. This results in changes of amplitude in the seismic recordings, and in time offsets in the recorded seismic traces. The comparative analysis of the recordings comprises an inversion to estimate the variations of the parameters in order to obtain an idea of the levels of saturation in the layers being operated.

A further inversion technique (warping) is described in EP 1 865 340 to the Applicant, and incorporated herein by reference, and comprises jointly inverting for the changes in the propagation times and seismic amplitudes of a seismic wavelet along propagation paths in the ground. By inverting it is possible to back filter, in effect, deriving the original from the solution.

The convolutional model defines seismic data as a convolution of a set of reflectivities with a seismic wavelet. It would be desirable to estimate the shape of the seismic wavelet with improved accuracy.

SUMMARY OF INVENTION

In a first aspect of the invention there is provided a method for characterising the evolution of a reservoir by determining a seismic wavelet which links observed seismic data to a sequence of reflectivities, said method comprising:
  obtaining seismic data representing seismic changes which have occurred between a first time and a second time, said seismic data comprising a plurality of seismic traces; and
  performing an optimisation operation simultaneously on said plurality of seismic traces so as to optimise for said seismic wavelet.

Other aspects of the invention comprise a computer program comprising computer readable instructions which, when run on suitable computer apparatus, cause the computer apparatus to perform the method of the first aspect; and an apparatus specifically adapted to carry out all the steps of any of the method of the first aspect.

Other non-essential features of the invention are as claimed in the appended dependent claims.

BRIEF DESCRIPTION OF THE DRAWINGS

Embodiments of the invention will now be described, by way of example only, by reference to the accompanying drawings, in which:

FIGS. 1a and 1b are schematic illustrations of a (1a) base survey and (1b) monitor survey being performed.

DETAILED DESCRIPTION OF THE EMBODIMENTS

Figure 2:
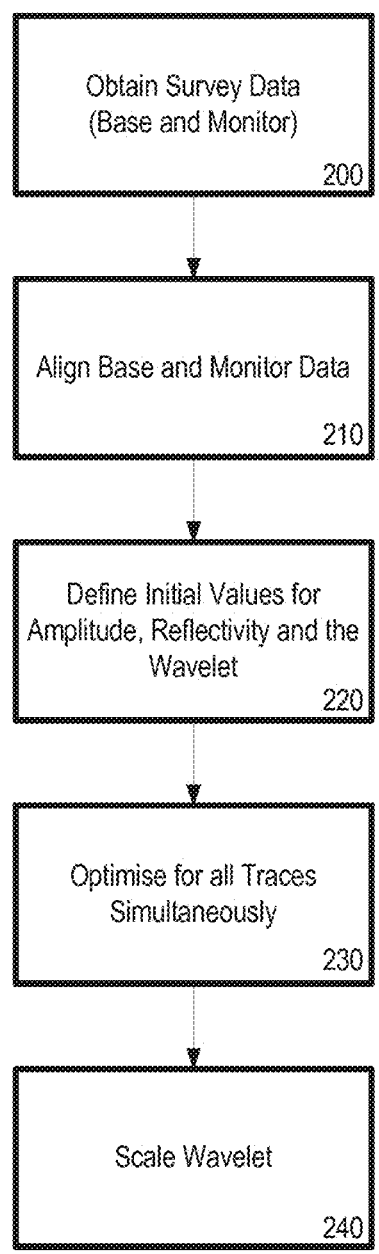
FIG. 2 is a flowchart describing a method according to an embodiment of the invention.

Referring initially to FIGS. 1a and 1b there is illustrated a reservoir, generally indicated by reference numeral 10, containing hydrocarbons 12 in the sub-surface 14. A survey vessel 16, upon which is located a sonar transmitter 18, being an acoustic source, and an array of receivers 20, performs a survey by travelling over the reservoir 10. The first or initial survey, FIG. 1a, may be referred to as a base survey and is typically performed in the exploration phase before production begins.

The base survey of the reservoir 10 provides a set of seismic traces at a first time T. For a given trace, the base survey provides amplitudes that are a function of time. With digital recording and processing the trace is sampled at a set of values; typical trace lengths correspond to around 1000 samples. The trace is then handled as a set of values.

One or more wells 22 may be drilled in order to extract the hydrocarbons 12. As the reservoir 10 is produced, hydrocarbons will be substituted by other fluids and the fluid pressure will change. Additionally, enhanced oil recovery techniques may be applied wherein a fluid is injected into the reservoir at one or more locations giving changes in fluid pressure and saturation. Changes within the reservoir may also change the stress and strain state of the surrounding rocks. Thus when a further survey is carried out, FIG. 2b, these changes will be seen due to a consequential change in the velocity field. These changes to velocity will produce time shifts in the seismic expression of underlying reflectors and associated changes in reflectivity, causing a change in the local wavefield.

Thus reservoir monitoring performs a monitor survey of the reservoir 10, taken at a second time T+Δ T, with a set of seismic traces. In the simplest assumption, Δ T is a positive quantity, and the monitor survey is taken at a time later than the base survey; however, the order in which the surveys are taken is irrelevant to the operation of the process of the invention and, in principle, the time lapse ΔT could as well be negative—which amounts to comparing the earlier survey to the later one. As for the base survey, a sampled trace in the monitor survey is represented as a set of values.

Ideally, the traces in the monitor survey are associated to the same positions as in the base survey. This is carried out by using, inasmuch as possible, the same equipment, acquisition geometry and processes for running the base and monitor surveys. Techniques such as interpolation may be used where traces in the monitor survey and in the base survey do not fulfil this condition.

In order to link the seismic data (traces) on which interpretations are based and the geology (reflection coefficients) being interpreted, the seismic wavelet (an impulse response which travels through the surface) is defined, based on the known convolutional model of a seismic trace, where the seismic trace is a convolution of the seismic wavelet with the subsurface reflectivity (plus noise). The seismic wavelet is the waveform which would be recorded by a seismic system for a reflection from a single plane reflecting boundary in the subsurface. This wavelet can be thought of as acting like a filter through which the geology is viewed when interpreting the image provided by seismic data. However, this wavelet needs to be estimated accurately.

The problem of wavelet estimation has been a key problem in geophysics for some time. Present methods of wavelet estimation comprise deconvolving a seismic trace with a sequence of reflection coefficients from a seismogram. A common way of estimating wavelets is to estimate the wavelet that would best match the reflectivities measured at the well using a convolution process on the 3D seismic data. This technique has many drawbacks which include:

1. Wavelets are not stable neither laterally nor vertically and if the wells are distant to the place of interest, the wavelets may not be well adapted;

2. Wavelets estimated in this way are adapted to 3D and may not be adequate for 4D processing;

3. This technique requires a large time window and so the estimated wavelet may be an "average" wavelet;

4. With better drilling technology the majority of wells (producer and injectors) are now drilled sub-vertically or in some cases horizontally through the reservoir. This makes conventional wavelet estimation difficult and sometimes impossible.

Other techniques attempt to estimate the wavelets directly from the seismic data: the spectrum can be estimated from the square root of the autocorrelation (with the assumption that reflectivity has a white spectrum) and phase through Kurtotsis analysis (with assumption of uniform distribution); however none of these approaches are reliable and they are hardly used.

The problem of an inaccurately defined wavelet is more acute when dealing with 4D seismic data since only tiny anomalies are being looked for, and an inaccurate wavelet can be a huge source of error. Despite this, wavelets estimated as above from 3D seismic data at the wellhead are typically used when interpreting 4D seismic data.

Therefore, instead of using the reflectivities measured at the well, it is proposed to use the reflectivities provided by the 4D signal. Advantages of this approach include:

1. 4D reflectivities are limited to only a small number of layers where dynamic changes have occurred;

2. the reflectivities can be measured away from the wells where the 4D signal actually exists.

FIG. 2 is a flowchart describing a method using the 4D signal to estimate the wavelet. At step 200, the Survey data (Base and Monitor) is obtained. This data may have been gathered as described in relation to FIGS. 1a and 1b.

At step 210, the monitor survey data is aligned to the base survey data. While the base and monitor surveys each show a large number of reflections (for every boundary), once aligned, most of the reflections overlap. Only in regions where changes have occurred over the time between the surveys will there be non-overlapping reflections. Consequently the change in the seismic data ΔS between base and monitor is sparse, with few dynamic reflections, and can be defined as:

$$\Delta S = \omega * R_m - \omega * R_B = \omega * \Delta R$$

where ω is the wavelet, $R_B$ are the base reflectivities, $R_m$ are the monitor reflectivities and ΔR is the change in reflectivities between base and monitor.

Considering a layer where the saturation or pressure (or both) have changed, there will be a change of impedance ΔIp at the top of this layer and an opposite change of impedance −ΔIp at the bottom of this layer. Therefore the change in reflectivities ΔR for any dynamic layer can be defined using only three parameters relating to the positions of the boundaries defining the layer and the magnitude of the reflectivity signal at these boundaries. In one embodiment, each layer is defined by the position of the layer top t (or bottom or any other position identifier), the thickness of the layer $\Delta t$ and the change in the reflectivity signal amplitude $\Delta A$ for the layer. The 4D seismic data observed will be the result of the convolution of the wavelet by a dipole of opposite sign at position t, t+$\Delta t$.

At step 220 initial values are given to the unknowns in $\omega\Delta R$ (amplitudes, initial reflectivities and the wavelet. A general initial guess of the number of layers is the minimum input. More complex initial guesses can optionally be made by picking horizons from the 4D or 3D data.

At step 230, all the seismic traces (or a subset thereof) are optimised simultaneously. The expected ranges of variation of the initial values can also be specified. This optimisation may be performed by minimising a cost function such as:

$$\text{cost}=\Delta S-\omega*\Delta R$$

although it should be appreciated that any norm or difference measurement of $\Delta S$ and $\omega*\Delta R$ can be used to calculate the cost.

While it is true that both the wavelet $\omega$ and $\Delta R$ are both unknown, their values relative to each another can be determined. The sparse distribution of the reflection coefficients in the 4D seismic data is the key of this technique. There are theorems in the super resolution literature showing that under certain conditions of sparsity the inversion process is exact. Of course the seismic data are not noise free and noise will perturb the inversion response. Fortunately as the single inversion uses data from several or many seismic traces, the wavelet can be constrained and a unique wavelet can be solved for. If instead of a single layer there are several layers where changes occur, the situation is the same since the convolution process is linear.

Therefore, for a signal composed of N traces, with M layers (composed of 2 reflectors) and a wavelet of length L, there are in total 3×M×N+L parameters to optimise (where the 3 in this total results from the three parameters which define $\Delta R$). This total is much smaller than N×S, where S is the number of samples. Therefore the problem is overconditioned.

With the wavelet estimated in this way, the absolute amplitude of the wavelet $\omega$ or of the change in reflectivity $\Delta R$ is unknown. In an embodiment, the relative impedance inversion values may be used as they are. In another embodiment, the wavelet may be scaled (step 240) to determine its absolute amplitude. A scaling factor $\alpha$ (positive or negative) may be defined, such that:

$$\Delta S=\alpha\omega*1/\alpha\Delta R$$

The scaling step determines the constant $\alpha$ that determines correctly the true scaled wavelet:

$$\omega_{true}=\alpha\omega,$$

and the true scaled reflectivity:

$$\Delta R_{true}=1/\alpha\Delta R,$$

There are a number of different options for performing scaling step 240, which include:

1. Convolving the unscaled wavelet with some true reflectivity measured (for example) at a well location: $S=\omega*\Delta R_{true}$ (local to the estimation or not). The computed synthetic trace (S) can be compared with true seismic ($S_{true}=\omega_{true}*\Delta R_{true}$) at the well location using the ratio:

$$S_{true}/S=\omega_{true}/\omega=\alpha.$$

2. Using travel-time information. By using the fact that 4D data has a time shift that is given by the integral of relative velocity changes it is possible to use the base and non-aligned monitor traces to determine the magnitude of $\Delta Vp/Vp$. Thus using the commonly known expression: $\Delta R\approx\Delta Ip/Ip\approx\Delta Vp/Vp+\Delta\rho/\rho\approx\beta\Delta VpVp$ and assuming a value for $\beta$, the true reflectivity can be approximated along with the scaling factor $\alpha$ (where $\Delta Vp/Vp$ is the change in p-wave velocity value, $\Delta Ip/Ip$ the change in impedance, and $\Delta\rho/\rho$ is the change in density). The factor $\beta$ may represent an estimated ratio between $\Delta Vp/Vp$, and $\Delta\rho/\rho$ (such an estimation can be made based upon knowledge of the subsurface composition, as is understood by the skilled person) and may in a specific embodiment equate to $1+\Delta Vp/Vp/\Delta\rho/\rho$.

3. It is also possible to use prior information based on production information, reservoir simulation and rock physics modelling to directly infer the maximum reflectivity changes ($\max(\Delta R_{true})$) expected, and to scale the data accordingly by $\max(\Delta R)/\max(\Delta R_{true})=\alpha$.

One or more steps of the methods and concepts described herein may be embodied in the form of computer readable instructions for running on suitable computer apparatus, or in the form of a computer system comprising at least a storage means for storing program instructions embodying the concepts described herein and a processing unit for performing the instructions. As is conventional, the storage means may comprise a computer memory (of any sort), and/or disk drive, optical drive or similar. Such a computer system may also comprise a display unit and one or more input/output devices.

The concepts described herein find utility in all aspects (real time or otherwise) of surveillance, monitoring, optimisation and prediction of hydrocarbon reservoir and well systems, and may aid in, and form part of, methods for extracting hydrocarbons from such hydrocarbon reservoir and well systems.

It should be appreciated that the above description is for illustration only and other embodiments and variations may be envisaged without departing from the spirit and scope of the invention.

The invention claimed is:

1. A method for characterising evolution of a reservoir by determining a seismic wavelet which links observed seismic data to a sequence of reflectivities, said method comprising:
    obtaining seismic data representing seismic changes which have occurred between a first time and a second time defining a production period over which hydrocarbons have been extracted, said seismic data comprising a plurality of seismic traces; and
    performing an optimisation operation simultaneously on said plurality of seismic traces so as to optimise for said seismic wavelet, said optimization operation comprising simultaneously optimising for said seismic wavelet and reflectivity change data occurring between said first time and said second time;
    extracting the time-lapsed changes in the seismic traces collected over the production period;
    integrating the time-lapsed changes in the seismic traces with production data;
    using the integrated time-lapsed changes in the seismic traces and the production data to manage at least one of extraction of oil and gas from the reservoir and injection of other fluids into the reservoir; and
    wherein said optimisation operation is performed without using known reflectivity data as an input.

2. The method as claimed in claim 1 wherein said optimisation comprises minimising a cost function comprising a measurement of a difference between the seismic data and a convolution of the seismic wavelet and reflectivity change data.

3. The method as claimed in claim 1 wherein each reflectivity change described by said reflectivity change data is defined by two parameters describing positions of two reflectors defining the change in reflectivity and a single amplitude parameter representing a magnitude of a measured amplitude change at the positions of said two reflectors, the amplitude change being equal in magnitude and of opposite sign at these positions.

4. The method as claimed in claim 1 comprising the steps of:
providing a base survey of the reservoir with a set of seismic traces at said first time;
providing a monitor survey of the reservoir, taken at said second time, with a set of seismic traces associated to the same positions as in the base survey; and
determining said seismic data from said base survey and monitor survey.

5. The method as claimed in claim 4 wherein said step of determining said seismic data comprises aligning said monitor and base surveys; and subtracting said base survey from said monitor survey.

6. The method as claimed in claim 4 wherein said base and monitor surveys have been performed at a location remote from a well, or adjacent to a horizontal or sub-vertical well.

7. The method as claimed in claim 4, wherein said base and monitor surveys have been performed at a location of interest for the wavelet being determined.

8. The method as claimed in claim 1 comprising a scaling step so as to determine an absolute value for amplitude of the seismic wavelet.

9. The method as claimed in claim 8 wherein said scaling step comprises defining a scaling factor such that $\Delta S = \alpha \omega * 1/\alpha \Delta R$, where $\alpha$ is the scaling factor, $\Delta S$ is the seismic data, w is the seismic wavelet and $\Delta R$ is a reflectivity change data.

10. The method as claimed in claim 8 wherein said scaling step comprises convolving an unscaled wavelet with actual reflectivity measurements taken from another location of the reservoir.

11. The method as claimed in claim 8 wherein said scaling step comprises using travel-time information to estimate the actual reflectivity measurements.

12. The method as claimed in claim 11 wherein said actual reflectivity measurements are determined from a product of measured relative velocity changes and a factor based on an estimated ratio between relative velocity changes and relative density changes.

13. The method as claimed in claim 8 wherein said scaling step comprises directly inferring maximum reflectivity changes from production history data.

14. The method as claimed in claim 1 further comprising the step of using results of said method to aid hydrocarbon recovery from a reservoir.

15. A computer program comprising computer readable instructions which, when run on suitable computer apparatus, cause the computer apparatus to perform the method of claim 1.

16. A computer program carrier comprising the computer program of claim 15.

17. An apparatus specifically adapted to carry out the steps of the method as claimed claim 1.

* * * * *